United States Patent [19]

Curran et al.

[11] 3,770,884

[45] Nov. 6, 1973

[54] LUMINANCE CONTROL CIRCUIT FOR MULTI-COLOR PERISCOPE VIEW SIMULATOR

[75] Inventors: William J. Curran, Orlando; John J. Kulik, Winter Park, both of Fla.

[73] Assignee: The United States of America as represented by the Secretary of the Navy, Washington, D.C.

[22] Filed: May 4, 1972

[21] Appl. No.: 250,219

Related U.S. Application Data

[63] Continuation-in-part of Ser. No. 224,165, Feb. 7, 1972.

[52] U.S. Cl. .......................... 178/5.4 R, 178/DIG. 6

[51] Int. Cl. .......................... H04n 5/22, H04n 9/04

[58] Field of Search .................... 178/DIG. 6, 5.4 R

[56] References Cited

UNITED STATES PATENTS

| | | | |
|---|---|---|---|
| 3,706,851 | 12/1972 | Froelich | 178/DIG. 6 |
| 3,278,676 | 10/1966 | Becker | 178/DIG. 6 |

*Primary Examiner*—Howard W. Britton
*Attorney*—Richard S. Sciascia et al.

[57] ABSTRACT

A luminance control circuit is added to circuitry for converting black and white video signals to color information for a color television display. Predetermined luminance values may be added to the video signals to obtain a more realistic, more conspicuous, or more variegated display.

2 Claims, 1 Drawing Figure

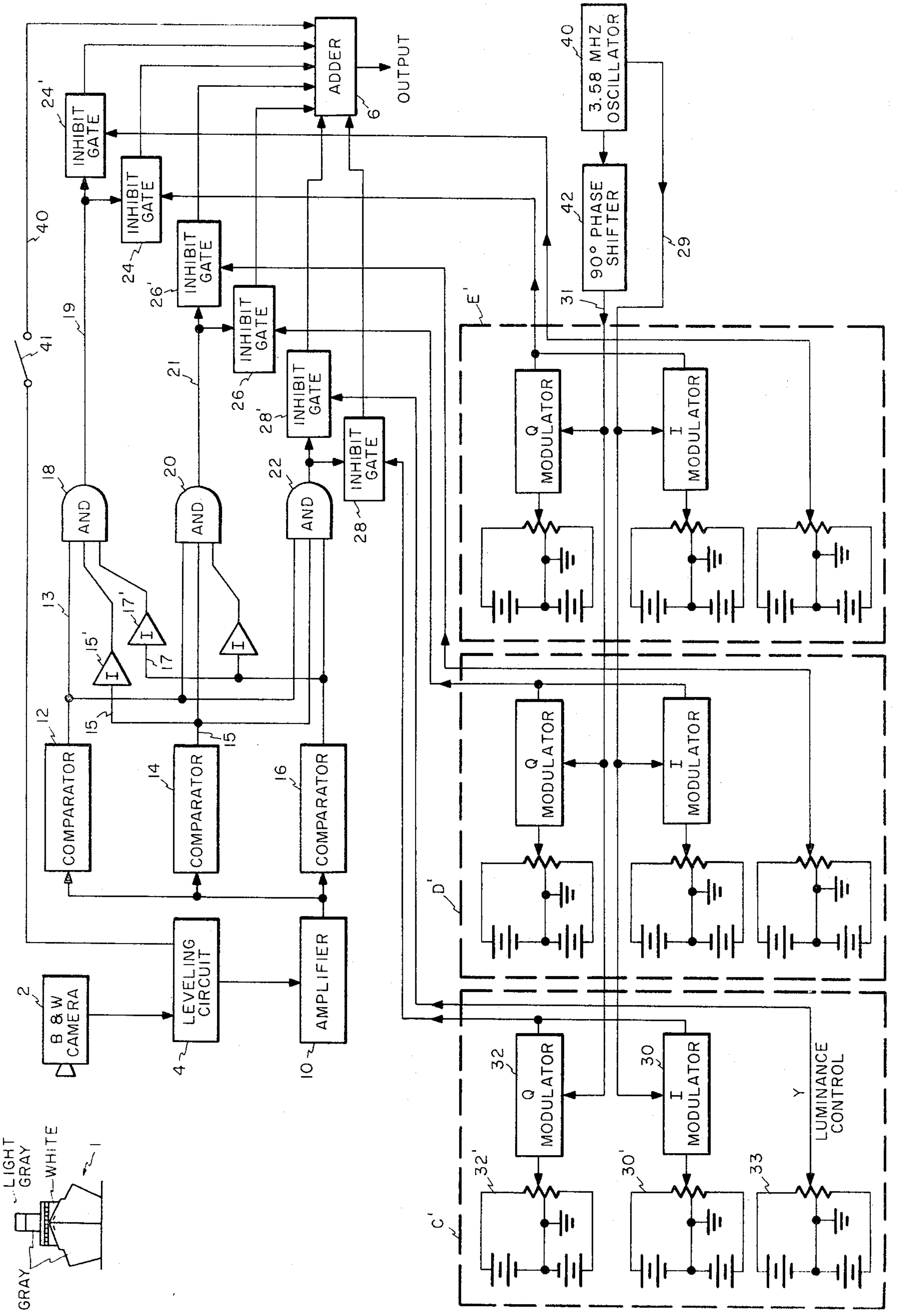
ADDER
OUTPUT
3.58 MHZ OSCILLATOR
90° PHASE SHIFTER
INHIBIT GATE
AND
COMPARATOR
LEVELING CIRCUIT
AMPLIFIER
B & W CAMERA
Q MODULATOR
I MODULATOR
Y LUMINANCE CONTROL
LIGHT GRAY
WHITE
GRAY

LUMINANCE CONTROL CIRCUIT FOR MULTI-COLOR PERISCOPE VIEW SIMULATOR

The invention is in the field of television and is a continuation-in-part of applicants' copending application Ser. No. 224,165, filed Feb. 7, 1972.

BACKGROUND OF THE INVENTION

In the prior art color television systems, expensive and complex color cameras are required to furnish video information to a color television receiver for display. In some systems such as those used in certain training devices a considerable number of cameras are required. The expense of providing several color cameras has proved prohibitive in some training applications. Applicants' copending application Ser. No. 224,165 discloses apparatus for utilizing monochrome cameras in a color television system used in a training device. The black and white cameras observe objects which are color coded in various shades of gray. The apparatus converts the camera video signals representing different shades of gray to predetermined colors in the display. However, some lack of realism in the display has occurred because the luminance of the object image is not necessarily a linear function of the shade observed.

The present invention solves this problem of the prior art by providing means to predetermine the luminance and thus the appearance of the color-coded object image in the television display to compensate for the nonlinearity of the video signal with respect to different shades of gray.

SUMMARY OF THE INVENTION

In applicants' aforementioned application is disclosed apparatus for adding predetermined color information to monochrome video information derived from black and white cameras which observe objects which are color-coded in shades of gray. This invention improves the resulting display by adding predetermined luminance information to the video signal to offset incongruities resulting from the altered luminance of the color-coded objects.

DESCRIPTION OF THE DRAWING

The drawing is a block diagram of the invention.

DESCRIPTION OF THE PREFERRED EMBODIMENT

Applicants' copending application Ser. No. 224,165 discloses apparatus for converting the video output signals of a black and white camera to a color television display. This apparatus is shown in the drawing where a ship model 1 is positioned in the field of view of a monochrome television camera 2. Ship model 1 is shown by way of example because one contemplated environment of the invention is in a training device which produces an animated television display of ships maneuvering against a seascape background. Ship model 1 is colored in different shades of gray which have different luminance values. For example, the hull and lower part of the funnel may be gray, the top of the funnel may be light gray, and the deckhouse may be white. As the scanning beam of camera 2 moves from one shade of gray to another on model 1 the video output signal of the camera changes in response to the changing luminosity of the area being scanned so that the instantaneous video signal is a function of the shade of gray being scanned. The video signal is processed and ultimately mixed in an adder 6 with a color signal derived from color circuits such as C', D', and E', shown as boxes in the lower half of the drawing. The output from adder 6 is applied to a color television receiver-monitor not shown. The image of model ship 1 which is displayed on the monitor will be in colors determined by the settings of color circuits C',D', and E'. The different video signal levels resulting from the different shades of gray on model 1 serve to gate the outputs of different color circuits to adder 6 so that the particular color displayed on the monitor is associated with a respective shade of gray.

As explained in applicants' aforementioned application, the video output signal from camera 2 is leveled in a leveling circuit 4 and applied over a line 40 to an adder 6. The video from 4 is also amplified in an amplifier 10 and applied to three comparators 12, 14, and 16. The comparators are biased at lower, intermediate, and higher voltages. A lower video signal will activate lower biased comparator 12 to develop an output signal which in conjunction with inverted output signals from comparators 14 and 16 causes AND gate 18 to develop an output signal The output signal from gate 18 is applied to a gate 24 which passes a color signal from color circuit E' to adder 6. Singals are forwarded from adder 6 to a color television monitor which is not shown. The signal from adder 6 may be applied to complex combining circuitry where it is combined with video signals from other cameras before being applied to the monitor. Such combining circuitry may be used to, for example, cause several ship or other model images to maneuver on the monitor screen in a seascape background scene. However such combining circuitry is not part of this invention.

When the video signal applied to the comparators reaches an intermediate level, both 12 and 14 will develop output signals which together with an inverted signal from 16 cause an AND gate 20 to develop an output which causes a gate 26 to pass a color signal from color circuit D' to adder 6. The inverted output of converter 14 also deactivates AND gate 18 so that the color signal from color circuit E' is prevented from reaching adder 6 by gate 24.

When the video signal applied to the comparators reaches a higher level an AND gate 22 responds to output signals from all three comparators to activate an inhibit gate 28 to pass a signal from color circuit C' to adder 6. Inverted output signals from comparators 14 and 16 cause AND gates 18 and 20 to be inactivated, thereby preventing color signals from color circuits E' and D' from passing gates 24 and 26.

In applicants' aforementioned application, levelling circuit 4 is connected to adder 6 to apply video directly to the adder where it is added to the color signal. Thus the information output of adder 6 when applied to the color television monitor will cause an image of ship model 1 to appear on the monitor screen. This image will appear in colors determined by the color coding of model 1 and the settings of color circuits C', D', and E'. In this application a connecting line 40 between leveling circuit 4 and adder 6 contains a switch 41 which is normally closed so that the video signal from 4 is applied to 6. However, switch 41 may be opened if desired so that the iamge of model ship 1 appearing on the television monitor screen will be in the form of a colored silhouette. This special effect may be desirable in certain training devices and situations. Model ship 1 may be positioned against a flat non-reflective background so that the video signal representing the model is sharply defined. Switch 41 is shown in mechanical form, however it can be an electronic switch remotely controllable if desired.

Applicants' color circuits as shown in the box C' comprise an I modulator 30 and a Q modulator 32. I modulator 30 modulates a 3.58 mhz signal received from an oscillator 40 over a lead 29 with a presettable voltage derived from a center tapped potentiometer 30'. Q modulator 32 modulates the 3.58 mhz signal from 40 phase shifted 90° in a phase shifter 42. A center tapped potentiometer 32' supplies the modulating voltage to 32. The settings of potentiometers 30' and 32' determines the color signal applied to adder 6 through gate 28. Color circuits D' and E' are identical to C'.

This invention adds a center tapped luminance potentiometer 33 to each color circuit C', D', and E'. The adjustment of luminance control circuit adjusts a luminance voltage which is applied to an inhibit gate 28' connected between 33 and adder 6. Luminance voltages are applied to two gates 26' and 24' from color circuits D' and E'. Output terminals of 26' and 24' are connected to inputs of adder 6. Gates 24', 26', and 28' are controlled by comparators 12, 14, and 16 and AND gates 18, 20, and 22 in the same manner as gates 24, 26, and 28. Therefore, when camera 2 scans a particular shade of gray one of gates 24', 26', or 28' will pass a luminance voltage to adder 6. This voltage is combined with the color and video voltages (when switch 41 is closed) in adder 6. The effect is a modification in the appearance of model 1 on the monitor screen.

The modified appearance of model 1 in the display has been found to be desirable in ceratin situations. One reason is that the luminance of the different shades of gray on the model is not always directly related to shade. Different coloring materials, model surfaces, model materials, lighting, and other factors affect the luminance of the different shades on the model in different ways. The luminance control circuit also provides an additional "special effects" capability to the system. For example, a particular model image may be "high lighted" by additional luminosity to emphasize or distinguish a particular ship in a fleet. Such capability may be useful in a particular training procedure, as in a lecture, a critique, or re-run of a problem.

The embodiment of the drawing is shown by way of example only. A practical system may include a great many color circuits and luminance control circuits. Many different shades of gray or other colors may be used for color coding. More complex "state of the art" comparison and gating systems may be used.

We claim:

1. In a television system wherein a color coded object is observed by a monochrome camera to develop a video signal having different levels related to respective shades on said color coded object, the improvement comprising:

a color monitor, an adder connected to furnish a sum signal to the input terminal of said monitor, said adder having a plurality of input terminals, a plurality of color circuits for providing color information to respective input terminals of said adder, a plurality of luminance circuits for providing luminance information to respective input terminals of said adder, and gating means responsive to the different levels of said video signal for selectively gating said color information from said color circuits and said luminance information from said luminance circuits to respective input terminals of said adder, whereby said color information and said luminance information may be selectively gated to said adder in accordance with various shades on said model to provide a summed video signal from said adder to said monitor to display an improved colored image of said model on said monitor.

2. The apparatus of claim 1, said gating means compising:

a plurality of pairs of inhibit gates, one inhibit gate of each pair being connected to pass or inhibit color information from a respective color circuit to said adder, the other inhibit gate of each pair being connected to pass or inhibit luminance information from a respective luminance circuit to said adder, a plurality of comparators, said comparators being connected to receive a video signal from said camera and to compare said video signal with a respective reference voltage, a plurality of AND gates, each of said AND gates being connected to furnish an output voltage to control a respective pair of said inhibit gates, each of said AND gates being connected to receive a plurality of comparison signals from said comparators to furnish a control signal to said pairs of inhibit gates to enable said inhibit gates to pass or inhibit said color signals and said luminance signals to said adder.

* * * * *